UNITED STATES PATENT OFFICE.

PIERRE PROSPER MONNET, OF LYONS, FRANCE, ASSIGNOR TO THE SOCIÉTÉ CHIMIQUE DES USINES DU RHÔNE, ANCIENNEMENT GILLIARD P. MONNET ET CARTIER, OF SAME PLACE.

PROCESS OF MAKING PYROCATECHIN-SULFONIC ACID.

SPECIFICATION forming part of Letters Patent No. 604,066, dated May 17, 1898.

Application filed November 22, 1897. Serial No. 659,515. (No specimens.) Patented in England July 6, 1896, No. 14,931, and in France April 30, 1897, No. 266,488.

*To all whom it may concern:*

Be it known that I, PIERRE PROSPER MONNET, of Lyons, France, have invented certain new and useful Improvements in the Manufacture of Pyrocatechin-Sulfonic Acid and Intermediate Products, (for which I have obtained a patent in Great Britain, No. 14,931, bearing date July 6, 1896, and in France, No. 266,488, bearing date April 30, 1897,) of which the following is a specification.

This invention relates to the manufacture of pyrocatechin-sulfonic acid and intermediate products.

Recently the monosulfonic acid of pyrocatechin has attained considerable importance in the chemical industry on account of its easy conversion into pyrocatechin.

This present invention consists of improvements in the manufacture of pyrocatechin-monosulfonic acid from paraphenol-sulfonic acid by means of effecting substitution in the benzene nucleus of the latter with a halogen and ultimately fusing the salt of, for instance, the sodium salt of halogenated phenol-sulfonic acid together with caustic alkali, whereby the halogen group is very readily replaced by hydroxyl, and the salt of pyrocatechin-monosulfonic acid is obtained.

Briefly, the sense of the chemical changes involved in the invention may be expressed by the following graphic formulæ:

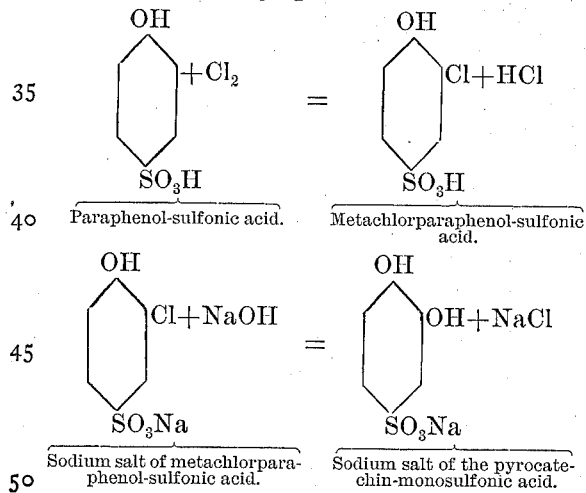

Paraphenol-sulfonic acid. Metachlorparaphenol-sulfonic acid.

Sodium salt of metachlorparaphenol-sulfonic acid. Sodium salt of the pyrocatechin-monosulfonic acid.

The preparation of paraphenol - sulfonic acid halogenated in the meta position, either by halogenation of the sulfonate or by sulfonation of halogenated phenols, has hitherto been accomplished with very great difficulty and small yields mixed with large quantities of isomeric or analogous products obtained. I have now discovered that by the introduction of a halogen, such as chlorin or bromin, into an acid solution of paraphenol-sulfonic acid a very much improved yield of meta-halogenated acid is obtained.

*Preparation of meta-halogenated paraphenol-sulfonic acid.*—Paraphenol-sulfonic acid may be prepared in the ordinary manner by heating together equal molecules of phenol and sulfuric acid of 66° Baumé for several days at water-bath temperature. The cooled and congealed mass is then dissolved in a third of its weight of water and five to ten per cent. of sulfuric acid added. A stream of chlorin gas or bromin is then conducted into the solution at ordinary temperature, two atoms of chlorin or bromin for each molecule of phenol-sulfonic acid in solution. Thus for ninety-four kilos phenol in the form of phenol-sulfonic acid seventy-one kilos chlorin or one hundred and sixty kilos bromin are used. During the process the temperature of the mixture rises from 20° to about 60° centigrade. The product of the reaction is poured into water, neutralized with lime, and the lime salt converted into the sodium salt by treatment with carbonate of soda in the usual manner. The principal product of the action of the halogen is the metamonohalogen derivatives of phenol-sulfonic acid together with small quantities of dihalogen derivatives of phenol-sulfonic acid. A small quantity of trichloro or tribromo phenol is also formed and can be recognized by its unpleasant characteristic odor. This body is, however, precipitated in a flocculent mass when the product of the reaction is poured into water prior to neutralization, and can be easily removed before the addition of the lime.

*Conversion of the meta-halogenated paraphenol-sulfonic acid into pyrocatechin-monosulfonic acid.*—To the sodium salt of the metahalogenated paraphenol-sulfonic acid obtained as above is added half its weight or an equal weight of caustic soda in aqueous solution. The whole is thoroughly mixed and then heated, either in an open vessel or under pressure, for eight to ten hours at about 250° centigrade or above. By this treatment the halogenated phenol-sulfonic acid is almost completely converted into pyrocatechin monosulfonic acid. The product is dissolved in water and neutralized with a mineral acid, preferably with thirty-per-cent. sulfuric acid in slight excess. The resulting solution is colored violet and with ferric chlorid gives a beautiful green coloration, which is characteristic of pyrocatechin-monosulfonic acid. By addition of carbonate of soda this color changes from green to blue, then violet, and finally red. The aqueous solution is evaporated to a syrupy consistency, allowed to cool, and the greater part of the sodium sulfate separated by crystallization. The crystals are filtered off and washed with cold water until free from color. The wash-water may serve for the solution of the next batch of the product or it may be evaporated and added to the original solution. A concentrated aqueous solution of the sodium salt of pyrocatechin-monosulfonic acid is thus obtained which without further purification on heating in an autoclave, preferably with dilute sulfuric acid, yields very pure pyrocatechin.

What I claim, and desire to secure by Letters Patent, is—

1. The method or process hereinbefore described of producing or preparing meta-halogenated paraphenol-sulfonic acid, which consists in treating an acid solution of paraphenol-sulfonic acid with a halogen, and thereby halogenating such paraphenol-sulfonic acid, substantially as set forth.

2. The method or process hereinbefore described of producing or preparing pyrocatechin-monosulfonic acid which consists in melting an alkaline salt of meta-halogenated paraphenol-sulfonic acid with caustic alkali, substantially as set forth.

3. The method or process hereinbefore described of producing or preparing pyrocatechin-monosulfonic acid, which consists in first introducing a halogen into an acid solution of paraphenol-sulfonic acid, and thereby halogenating such paraphenol-sulfonic acid, then producing an alkaline salt of the halogenated product, and then melting the said salt with caustic alkali at a temperature not below about 250° centigrade, substantially as set forth.

In witness whereof I have hereunto signed my name in the presence of two subscribing witnesses.

PIERRE PROSPER MONNET.

Witnesses:
RODOLPHE PFISTER,
EMILE HARQUETANT.